United States Patent
Kageyama et al.

(10) Patent No.: US 11,015,834 B2
(45) Date of Patent: May 25, 2021

(54) AIR CONDITIONING SYSTEM, AIR CONDITIONING METHOD, AND CONTROL DEVICE

(71) Applicant: HITACHI-JOHNSON CONTROLS AIR CONDITIONING, INC., Tokyo (JP)

(72) Inventors: Yuma Kageyama, Tokyo (JP); Tetsuya Kozai, Tokyo (JP); Yuki Uchino, Tokyo (JP)

(73) Assignee: HITACHI-JOHNSON CONTROLS AIR CONDITIONING, INC., Tokyo (JP)

( * ) Notice: Subject to any disclaimer, the term of this patent is extended or adjusted under 35 U.S.C. 154(b) by 61 days.

(21) Appl. No.: 16/278,902

(22) Filed: Feb. 19, 2019

(65) Prior Publication Data

US 2019/0186777 A1 Jun. 20, 2019

Related U.S. Application Data

(63) Continuation of application No. PCT/JP2018/019740, filed on May 23, 2018.

(30) Foreign Application Priority Data

Jun. 12, 2017 (JP) .............................. JP2017-115048

(51) Int. Cl.
*F24F 11/77* (2018.01)
*F24F 11/84* (2018.01)
(Continued)

(52) U.S. Cl.
CPC .............. *F24F 11/77* (2018.01); *F24F 3/044* (2013.01); *F24F 11/36* (2018.01); *F24F 11/52* (2018.01);
(Continued)

(58) Field of Classification Search
CPC ...... F25B 2313/0293; F25B 2313/0314; F25B 2500/222; F25B 2600/11; F25B 2600/111;
(Continued)

(56) References Cited

U.S. PATENT DOCUMENTS 4,506,518 A 3/1985 Yoshikawa et al.
4,651,535 A * 3/1987 Alsenz ............... G05D 23/1913
62/225

(Continued)

FOREIGN PATENT DOCUMENTS

EP 1 152 195 A1 11/2001
EP 2 581 242 A1 4/2013
(Continued)

OTHER PUBLICATIONS

Japanese Office Action received in corresponding Japanese Application No. 2018-542305 dated Nov. 5, 2019.
(Continued)

*Primary Examiner* — Marc E Norman
(74) *Attorney, Agent, or Firm* — Mattingly & Malur, PC

(57) ABSTRACT

An air conditioning system provided which has: an outdoor device including at least a compressor and a first heat exchanger; an air handling device including an air supply fan and a second heat exchanger; an expansion valve; and a control section, wherein the compressor, the first heat exchanger, the expansion valve, and the second heat exchanger are sequentially connected in an annular shape to form a refrigerant circuit in which refrigerant circulates, and the control section adjusts a rotation speed of the air supply fan and/or a degree of opening of the expansion valve based on information including a temperature detection value of refrigerant on each of one end side and the other end side of the second heat exchanger, a temperature detection value of air toward the second heat exchanger, and a temperature detection value of air heat-exchanged by the second heat exchanger.

7 Claims, 4 Drawing Sheets

(51) Int. Cl.
    *F24F 11/86*     (2018.01)
    *F24F 11/52*     (2018.01)
    *F25B 49/02*     (2006.01)
    *F24F 3/044*     (2006.01)
    *F24F 11/36*     (2018.01)
    *F24F 11/74*     (2018.01)
    *F25B 13/00*     (2006.01)
    *F25B 40/02*     (2006.01)
    *F24F 11/64*     (2018.01)
    *F24F 140/20*    (2018.01)

(52) U.S. Cl.
    CPC .............. *F24F 11/64* (2018.01); *F24F 11/74* (2018.01); *F24F 11/84* (2018.01); *F24F 11/86* (2018.01); *F25B 13/00* (2013.01); *F25B 40/02* (2013.01); *F25B 49/02* (2013.01); *F24F 2140/20* (2018.01); *F25B 2313/0293* (2013.01); *F25B 2313/0314* (2013.01); *F25B 2400/0401* (2013.01); *F25B 2400/13* (2013.01); *F25B 2500/222* (2013.01); *F25B 2600/2513* (2013.01)

(58) Field of Classification Search
    CPC ........ F25B 2600/112; F25B 2600/2513; F25B 2700/21162; F25B 2700/21163; F25B 2700/21172; F25B 2700/21173; F25B 2700/21174; F25B 2700/21175; F24F 11/36; F24F 11/52; F24F 11/74; F24F 11/77; F24F 11/84; F24F 2140/20
    See application file for complete search history.

(56) References Cited

U.S. PATENT DOCUMENTS

| | | | |
|---|---|---|---|
| 5,115,643 A | | 5/1992 | Hayata et al. |
| 5,392,612 A | * | 2/1995 | Alsenz .................. F25B 49/02 62/115 |
| 5,402,652 A | | 4/1995 | Alsenz |
| 6,105,379 A | | 8/2000 | Alsenz et al. |
| 9,791,174 B2 | * | 10/2017 | Izadi-Zamanabadi .... F25B 1/00 |
| 2004/0068999 A1 | * | 4/2004 | Jessen .................. F25B 49/02 62/222 |
| 2005/0086952 A1 | * | 4/2005 | Nonaka ................ F25B 49/005 62/129 |
| 2006/0144059 A1 | * | 7/2006 | Kang .................... F25B 49/005 62/129 |
| 2010/0152903 A1 | | 6/2010 | Takenaka et al. |
| 2010/0180630 A1 | * | 7/2010 | Ogawa .................. F25B 41/04 62/498 |
| 2013/0019617 A1 | * | 1/2013 | Hegar .................. F25B 47/022 62/81 |
| 2015/0075766 A1 | * | 3/2015 | Alston .................. F24F 11/77 165/287 |
| 2016/0153686 A1 | * | 6/2016 | Matsui .................. F25B 13/00 62/183 |
| 2017/0153037 A1 | | 6/2017 | Goel et al. |
| 2018/0209697 A1 | * | 7/2018 | Nishida ................ G05D 23/20 |
| 2019/0011156 A1 | | 1/2019 | Izadi-Zamanabadi |

FOREIGN PATENT DOCUMENTS

| | | | |
|---|---|---|---|
| EP | 3124897 A1 * | 2/2017 | ........... F25B 30/02 |
| JP | 09-273797 A | 10/1997 | |
| JP | 2002-98387 A | 4/2002 | |
| JP | 2007-263483 A | 10/2007 | |
| JP | 2016-109344 A | 6/2016 | |
| JP | 2016-114286 A | 6/2016 | |
| JP | 2017-053566 A | 3/2017 | |
| WO | 2009/011197 A1 | 1/2009 | |
| WO | 2015/166576 A1 | 11/2015 | |
| WO | 2017/121721 A1 | 7/2017 | |

OTHER PUBLICATIONS

International Search Report of PCT/JP2018/019740 dated Jul. 24, 2018.
Extended European Search Report received in corresponding European Application No. 18817745.5 dated Feb. 12, 2021.

* cited by examiner

AIR CONDITIONING SYSTEM, AIR CONDITIONING METHOD, AND CONTROL DEVICE

CROSS-REFERENCE TO RELATED APPLICATION

This application claims priority from Japanese Patent Application No. 2017-115048 filed with the Japan Patent Office on Jun. 12, 2017, the entire contents of which are hereby incorporated by reference.

BACKGROUND

1. Technical Field

The present disclosure relates to an air conditioning system, an air conditioning method, and a control device.

2. Description of the Related Art

An air handling device having a heat exchanger and an air supply fan and used for air conditioning for large-scale facilities and the like has been known. For example, a technique described in JP-A-2016-109344 has been known as an air conditioning system including such an air handling device. That is, JP-A-2016-109344 describes an air conditioning system including "a unit number control section configured to control the number of compressors to be operated and the operation frequency of each compressor to be operated . . . to satisfy a capacity request according to an air conditioning load."

SUMMARY

An air conditioning system according to the present disclosure, includes an outdoor device including at least a compressor and a first heat exchanger; an air handling device including an air supply fan and a second heat exchanger; an expansion valve; and a control section, wherein the compressor, the first heat exchanger, the expansion valve, and the second heat exchanger are sequentially connected in an annular shape to form a refrigerant circuit in which refrigerant circulates, and the control section adjusts a rotation speed of the air supply fan and/or a degree of opening of the expansion valve based on information including a temperature detection value of refrigerant on each of one end side and the other end side of the second heat exchanger, a temperature detection value of air toward the second heat exchanger, and a temperature detection value of air heat-exchanged by the second heat exchanger.

DESCRIPTION OF THE EMBODIMENTS

Figure 1:
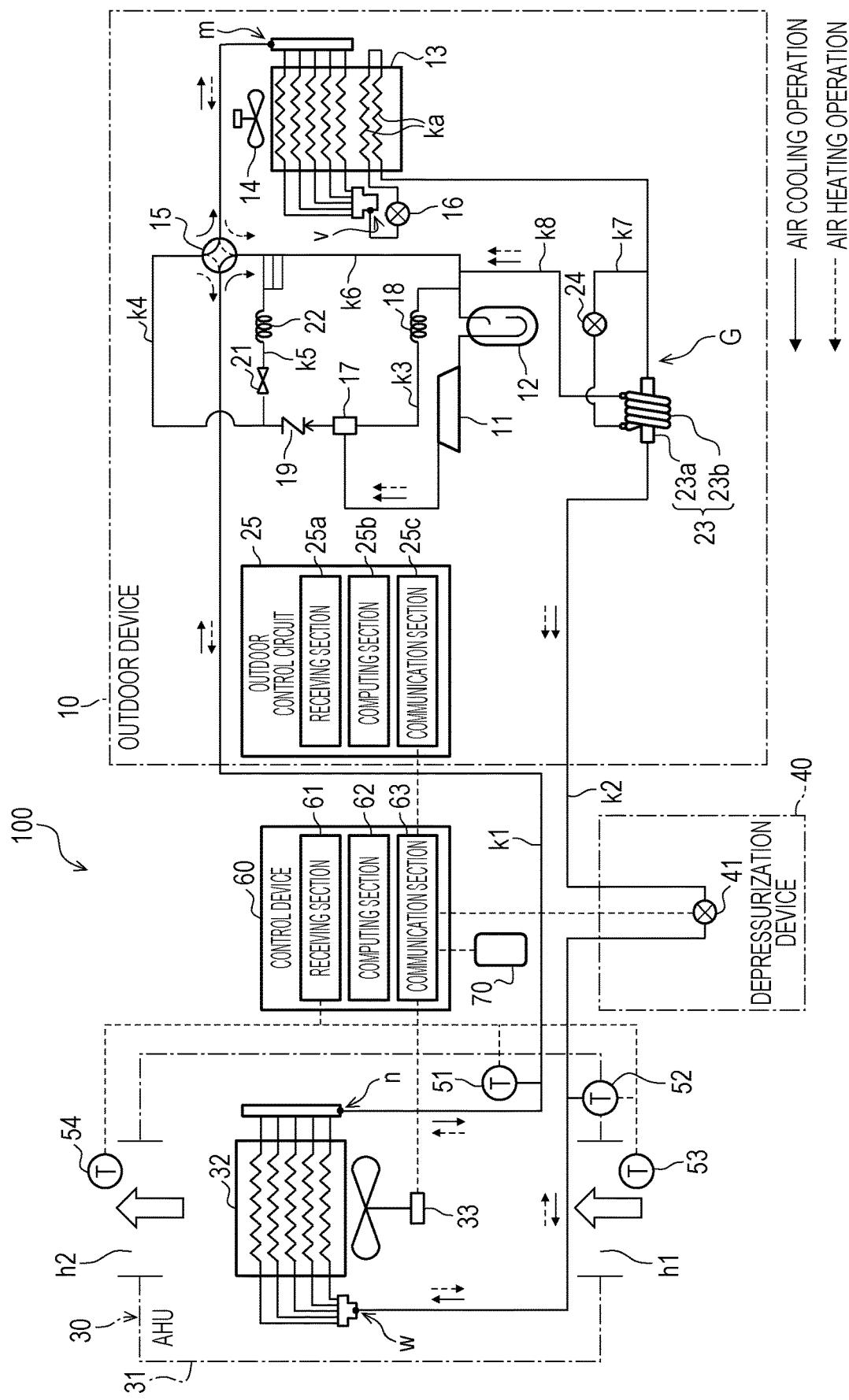
FIG. 1 is a diagram of a configuration of an air conditioning system according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As described above, JP-A-2016-109344 describes control of the compressors, but fails to describe control of equipment included in an air handling device.

Upon selection of an air handling device as a connection target of an outdoor device, specifications of the air handling device are limited in many cases, considering reliability of a refrigeration cycle. For example, the specifications of the air handling device are limited such that heat exchange performance equivalent to that of a typical indoor device is provided. As a specific example, in the case of requiring high heat exchange performance, an air handling device having a high-capacity heat exchanger is targeted for selection, and other units are excluded from selection targets. As described above, there is a situation where in selection of the air handling device, if the specifications of the air handling device are limited, the degree of freedom in selection is lowered (i.e., available air handling device options which can be combined with the outdoor device are reduced).

For this reason, the present disclosure is intended to provide an air conditioning system and the like having a high degree of freedom in selection of an air handling device.

For solving the above-described problem, the present disclosure includes an outdoor device having at least a compressor and a first heat exchanger, an air handling device having an air supply fan and a second heat exchanger, an expansion valve, and a control section. The compressor, the first heat exchanger, the expansion valve, and the second heat exchanger are sequentially connected in an annular shape to form a refrigerant circuit in which refrigerant circulates, and the control section adjusts the rotation speed of the air supply fan and/or the degree of opening of the expansion valve based on information including a temperature detection value of refrigerant on each of one end side and the other end side of the second heat exchanger, a temperature detection value of air toward the second heat exchanger, and a temperature detection value of air heat-exchanged by the second heat exchanger.

According to an embodiment of the present disclosure, the air conditioning system and the like having a high degree of freedom in selection of the air handling device can be provided.

First Embodiment

<Configuration of Air Conditioning System>

FIG. 1 is a diagram of a configuration of an air conditioning system 100 according to a first embodiment.

Note that solid arrows of FIG. 1 indicate a refrigerant flow direction in air cooling operation, and dashed arrows of FIG. 1 indicate a refrigerant flow direction in air heating operation.

Moreover, white arrows illustrated in the vicinity of an air handling device 30 (in FIG. 1, illustrated as an "AHU") of FIG. 1 indicate an air flow direction.

The air conditioning system 100 is a system configured to cause refrigerant to circulate in a refrigeration cycle (a heat pump cycle), thereby performing air conditioning.

As illustrated in FIG. 1, the air conditioning system 100 includes an outdoor device 10, the air handling device 30, and a depressurization device 40. Moreover, the air conditioning system 100 includes, in addition to the above-described configurations, refrigerant temperature sensors 51, 52, air temperature sensors 53, 54, a control device 60 (a control section), and a remote controller 70 (a display section).

(Outdoor Device)

The outdoor device 10 includes a compressor 11, an accumulator 12, an outdoor heat exchanger 13 (a first heat exchanger), an outdoor fan 14, a four-way valve 15, and an outdoor expansion valve 16. Moreover, the outdoor device 10 includes, in addition to the above-described configurations, an oil separator 17, capillary tubes 18, 22, a check valve 19, a two-way valve 21, a supercooler 23, a supercooling expansion valve 24, and an outdoor control circuit 25.

The compressor 11 is equipment configured to compress low-temperature low-pressure gas refrigerant to discharge the resultant refrigerant as high-temperature high-pressure gas refrigerant.

The accumulator 12 is a shell-shaped member configured to perform gas-liquid separation for refrigerant, and is provided on a suction side of the compressor 11.

The outdoor heat exchanger 13 is a heat exchanger configured to exchange heat between refrigerant flowing in a heat transfer pipe (not shown) of the heat exchanger and external air sent from the outdoor fan 14.

The outdoor fan 14 is a fan configured to send external air to the outdoor heat exchanger 13, and is placed in the vicinity of the outdoor heat exchanger 13.

The four-way valve 15 is a valve configured to switch the refrigerant flow direction according to an operation mode of the air conditioning system 100. That is, in the air cooling operation (see the solid arrows), a discharge side of the compressor 11 is connected to one end m of the outdoor heat exchanger 13 via the four-way valve 15 and the like, and the suction side of the compressor 11 is connected to one end n of a heat exchanger 32 (a second heat exchanger) via the four-way valve 15, a pipe k1, and the like. Accordingly, the outdoor heat exchanger 13 functions as a condenser, and the heat exchanger 32 functions as an evaporator. Note that the above-described pipe k1 is a pipe in which gas refrigerant flows. The four-way valve 15 and one end n of the heat exchanger 32 are connected to each other via the pipe k1.

In the air heating operation (see the dashed arrows), the discharge side of the compressor 11 is connected to one end n of the heat exchanger 32 via the four-way valve 15, the pipe k1, and the like, and the suction side of the compressor 11 is connected to one end m of the outdoor heat exchanger 13 via the four-way valve 15 and the like. Accordingly, the heat exchanger 32 functions as the condenser, and the outdoor heat exchanger 13 functions as the evaporator.

The outdoor expansion valve 16 is a valve configured to depressurize refrigerant flowing into the outdoor expansion valve 16 itself, and is placed in the vicinity of the other end v of the outdoor heat exchanger 13 at a pipe k2. Note that the pipe k2 is a pipe in which liquid refrigerant or gas-liquid two-phase refrigerant flows. The other end v of the outdoor heat exchanger 13 and the other end w of the heat exchanger 32 are connected to each other via the pipe k2. In an example illustrated in FIG. 1, part (between the outdoor expansion valve 16 and the supercooler 23) of the pipe k2 is formed as a heat transfer pipe ka, and the heat transfer pipe ka penetrates a fin of the outdoor heat exchanger 13.

The oil separator 17 is configured to separate lubricant oil mixed with refrigerant discharged from the compressor 11, and is placed on the discharge side of the compressor 11. The lubricant oil separated by the oil separator 17 is guided to the accumulator 12 via a pipe k3. Meanwhile, the refrigerant from which the lubricant oil has been separated by the oil separator 17 is guided to the four-way valve 15 via the later-described check valve 19 and the like.

The capillary tube 18 is a metal pipe having a relatively-small diameter, and is placed at the above-described pipe k3.

The check valve 19 is a valve configured to allow a refrigerant flow toward the four-way valve 15 via the oil separator 17 and prevent a flow in the opposite direction, and is placed on a downstream side of the oil separator 17.

The two-way valve 21 and the capillary tube 22 are members configured to return lubricant oil mixed with refrigerant to the accumulator 12, and are placed at a pipe k5. Note that the above-described pipe k5 is, at an upstream end thereof, connected to a downstream side of the check valve 19, and at a downstream end branched into three pipes, is connected to a pipe k6 (a pipe connecting the four-way valve 15 and the accumulator 12 to each other).

The supercooler 23 is configured to cool refrigerant condensed in the outdoor heat exchanger 13 or the heat exchanger 32, and is placed between the outdoor expansion valve 16 and a later-described expansion valve 41 at the pipe k2. As illustrated in FIG. 1, the supercooler 23 includes a supercooling main flow pipe 23a forming part of the pipe k2, and a supercooling sub flow pipe 23b forming, together with the supercooling main flow pipe 23a, a double-pipe structure. Heat is exchanged between refrigerant flowing in the supercooling main flow pipe 23a and refrigerant flowing in the supercooling sub flow pipe 23b.

As illustrated in FIG. 1, the supercooling sub flow pipe 23b is, at one end thereof, connected to the pipe k2 (between the supercooler 23 and the outdoor expansion valve 16) via a pipe k7, and at the other end thereof, is connected to the pipe k6 (an upstream side of the accumulator 12) via a pipe k8.

The supercooling expansion valve 24 is a valve configured to depressurize refrigerant flowing into the supercooling expansion valve 24 itself, and is placed at the above-described pipe k7.

Although not shown in the figure, the outdoor control circuit 25 includes electronic circuits such as a central processing unit (CPU), a read only memory (ROM), a random access memory (RAM), and various interfaces. A program stored in the ROM is read and loaded into the RAM, and the CPU executes various types of processing.

As illustrated in FIG. 1, the outdoor control circuit 25 includes a receiving section 25a, a computing section 25b, and a communication section 25c.

The receiving section 25a is configured to receive a detection value of not-shown each sensor (an outdoor temperature sensor, sensors configured to detect, e.g., a suction temperature, a discharge temperature, and a discharge pressure of the compressor 11) placed at the outdoor device 10.

The computing section 25b is configured to compute control command values for the compressor 11, the outdoor fan 14, the four-way valve 15, the outdoor expansion valve 16, the supercooling expansion valve 24 and the like based on each detection value received by the receiving section 25a, data acquired from the control device 60, and the like.

The communication section 25c has the function of performing predetermined communication with the later-described control device 60.

(Air Handling Device)

The air handling device 30 is equipment configured to take air via an opening h1 of a housing 31 and supply air heat-exchanged by the heat exchanger 32 to an air conditioning target space via another opening h2. As illustrated in FIG. 1, the air handling device 30 includes the housing 31, the heat exchanger 32, and an air supply fan 33.

The housing 31 is a box-shaped member in which the heat exchanger 32 and the air supply fan 33 are placed.

The heat exchanger 32 is a heat exchanger configured to exchange heat between refrigerant flowing in a heat transfer pipe (not shown) of the heat exchanger and air sent from the air supply fan 33.

The air supply fan 33 is a fan configured to send air to the heat exchanger 32, and is placed in the vicinity of the heat exchanger 32.

(Depressurization Device)

The depressurization device 40 includes the expansion valve 41. The expansion valve 41 is a valve configured to depressurize refrigerant flowing in the expansion valve 41 itself and adjust a refrigerant circulation flow rate. As illustrated in FIG. 1, the expansion valve 41 is placed between the supercooler 23 and the heat exchanger 32 at the pipe k2.

In a refrigerant circuit G configured such that the compressor 11, the outdoor heat exchanger 13, the outdoor expansion valve 16, the supercooler 23, the expansion valve 41, and the heat exchanger 32 are sequentially connected in an annular shape via the four-way valve 15, refrigerant circulates in the refrigeration cycle.

Note that the above-described phrasing of "sequentially connected in an annular shape" is not intended to limit the refrigerant flow direction. For example, during the air heating operation (see the dashed arrows), refrigerant sequentially circulates in the compressor 11, the heat exchanger 32, the expansion valve 41, the supercooler 23, the outdoor expansion valve 16, and the outdoor heat exchanger 13.

(Sensors)

The refrigerant temperature sensor 51 is a sensor configured to detect a refrigerant temperature on a one-end-n side of the heat exchanger 32, and is placed at the pipe k1.

The refrigerant temperature sensor 52 is a sensor configured to detect a refrigerant temperature on the other-end-w side of the heat exchanger 32, and is placed at the pipe k2.

The air temperature sensor 53 is a sensor configured to detect an air temperature on a suction side of the air handling device 30, and is placed in the vicinity of the opening h1. That is, the air temperature sensor 53 is a sensor configured to detect the temperature of air toward the heat exchanger 32.

The air temperature sensor 54 is a sensor configured to detect an air temperature on a discharge side of the air handling device 30, and is placed in the vicinity of the opening h2. That is, the air temperature sensor 54 is a sensor configured to detect the temperature of air heat-exchanged by the heat exchanger 32.

(Control Device)

Although not shown in the figure, the control device 60 includes electronic circuits such as a CPU, a ROM, a RAM, and various interfaces. A program stored in the ROM is read and loaded into the RAM, and the CPU executes various types of processing. The control device 60 is configured to control the air supply fan 33 and the expansion valve 41 based on, e.g., detection values of the refrigerant temperature sensors 51, 52 and the air temperature sensors 53, 44.

As illustrated in FIG. 1, the control device 60 includes a receiving section 61, a computing section 62, and a communication section 63.

The receiving section 61 is configured to receive the detection values of the refrigerant temperature sensors 51, 52 and the air temperature sensors 53, 54.

The computing section 62 is configured to compute control command values for the air supply fan 33 and the expansion valve 41 based on each detection value received by the receiving section 61.

The communication section 63 is configured to output the control command values computed by the computing section 62 to the air supply fan 33 and the outdoor expansion valve 16 and perform predetermined communication with the outdoor control circuit 25 and the remote controller 70.

(Remote Controller)

The remote controller 70 has the function of performing predetermined displaying (the operation mode, a timer setting, an indication of a set temperature and the like, a later-described warning indication) regarding air conditioning and transmitting a predetermined signal based on user operation to the control device 60.

<Operation of Air Conditioning System>

Figure 2:
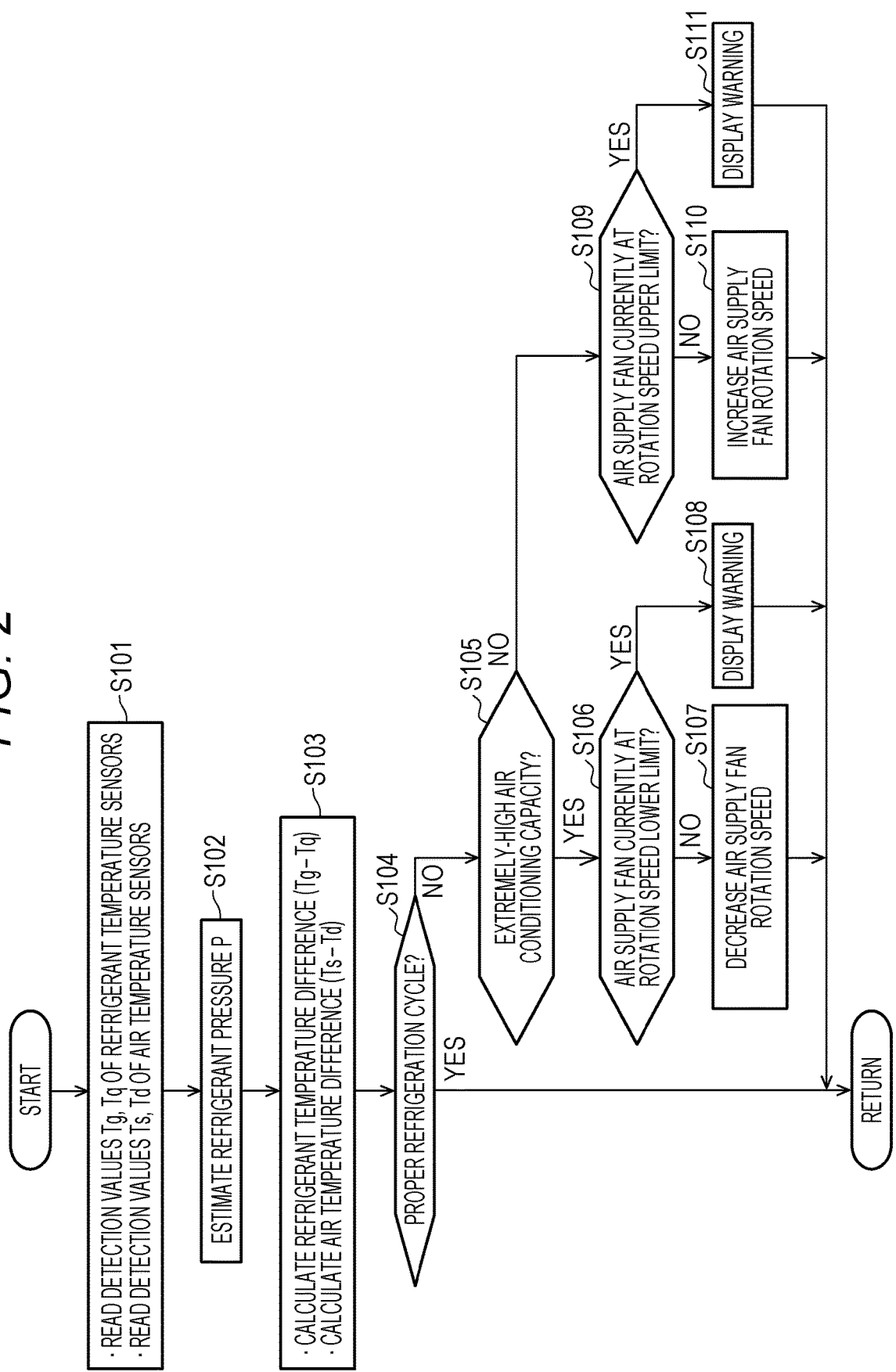
FIG. 2 is a flowchart of processing of a control device included in the air conditioning system according to the first embodiment of the present disclosure.

FIG. 2 is a flowchart of processing executed by the control device 60 (as necessary, see FIG. 1). Note that a series of processing illustrated in FIG. 2 may be performed at the stage of test operation of the air conditioning system 100, or may be performed during normal air conditioning operation.

Moreover, in many cases, heat exchange performance (a heat transfer area and an internal pipe volume) of the heat exchanger 32 and an optimal air volume based on such performance are not known in advance on a control device 60 side. In these cases, the control device 60 drives, at an initial stage of activation of the air conditioning system 100, the air supply fan 33 at a preset predetermined rotation speed.

At a step S101, the control device 60 reads a detection value Tg of the refrigerant temperature sensor 51 and a detection value Tq of the refrigerant temperature sensor 52. Moreover, at the step S101, the control device 60 reads a detection value Ts of the air temperature sensor 53 and a detection value Td of the air temperature sensor 54.

At a step S102, the control device 60 estimates a refrigerant pressure P. As one example, the control device 60 calculates the refrigerant pressure P (the pressure of refrigerant condensed by the heat exchanger 32) on a liquid side based on the detection values Tg, Tq read at the step S101.

Note that information regarding physical properties (a relationship between a saturation pressure and a saturation temperature) of refrigerant sealed in the refrigerant circuit G is stored in advance in the control device 60. At the step S102, the control device 60 estimates the refrigerant pressure P based on the above-described information regarding the refrigerant physical properties and the detection values Tg, Tq.

At a step S103, the control device 60 calculates a refrigerant temperature difference (Tg−Tq) based on the detection values Tg, Tq read at the step S101. That is, the control device 60 calculates the refrigerant temperature difference (Tg−Tq) as a difference between the refrigerant temperature (the detection value Tg) on the one-end-n side of the heat exchanger 32 and the refrigerant temperature (the detection value Tq) on the other-end-w side.

Moreover, at the step S103, the control device 60 calculates an air temperature difference (Ts−Td) based on the detection values Ts, Td read at the step S101. That is, the control device 60 calculates the air temperature difference (Ts—Td) as a difference between a temperature (the detection value Ts) on an air suction side of the heat exchanger 32 and a temperature (the detection value Td) on a discharge side.

At a step S104, the control device 60 determines whether or not the refrigeration cycle in the refrigerant circuit G is in a proper state. In other words, the control device 60 determines whether or not heat exchange is properly performed in the above-described condenser or evaporator. As one example, the control device 60 calculates the degree of supercooling of condensed refrigerant and the degree of superheating of evaporated refrigerant based not only on the refrigerant pressure P calculated at the step S102 but also on the refrigerant temperature difference (Tg–Tq) and the air temperature difference (Ts—Td) calculated at the step S103, and determines whether or not these values are within predetermined proper ranges.

At the step S104, in a case where the refrigeration cycle is in the proper state (S104: Yes), the processing of the control device 60 returns to "START" ("RETURN"). On the other hand, at the step S104, in a case where the refrigeration cycle is not in the proper state (S104: No), the processing of the control device 60 proceeds to a step S105.

At the step S105, the control device 60 determines whether or not an air conditioning capacity is extremely higher as compared to an air conditioning load. For example, in the air cooling operation, in a case where a value $\Delta T=(T_{set}-Td)$ obtained in such a manner that the detection value Td (the air temperature on the discharge side) is subtracted from a set temperature $T_{set}$ based on operation of the remote controller 70 is greater than a predetermined threshold, the control device 60 determines that the air conditioning capacity is extremely high.

At the step S105, in a case where the air conditioning capacity is extremely higher as compared to the air conditioning load (S105: Yes), the processing of the control device 60 proceeds to a step S106. For example, when a high-capacity heat exchanger 32 with a large heat transfer area and a high internal pipe volume is used and the air volume of the air supply fan 33 is relatively high, there is a probability that the air conditioning capacity is extremely high. When such a state is continued for a long period of time, a situation such as overcooling or overheating of the air conditioning target space might occur.

At the step S106, the control device 60 determines whether or not a current rotation speed of the air supply fan 33 is decreased to a predetermined rotation speed lower limit. This rotation speed lower limit is the lower limit of the rotation speed of the air supply fan 33, and is set in advance.

At the step S106, in a case where the current rotation speed of the air supply fan 33 is higher than the rotation speed lower limit (S106: No), the processing of the control device 60 proceeds to a step S107.

At the step S107, the control device 60 decreases the rotation speed of the air supply fan 33. Accordingly, the air volume of the air supply fan 33 is decreased, and heat exchange performance of the air handling device 30 is reduced. Thus, the air conditioning target space is properly air-conditioned.

On the other hand, in a case where the current rotation speed of the air supply fan 33 is, at the step S106, decreased to the rotation speed lower limit (S106: Yes), the processing of the control device 60 proceeds to a step S108.

At the step S108, the control device 60 transmits a warning display signal to the remote controller 70. That is, even when the rotation speed of the air supply fan 33 is decreased to the predetermined rotation speed lower limit (S106: Yes), if the air conditioning capacity is extremely high (S105: Yes), the control device 60 displays such a situation on the remote controller 70 (S108). In a case where such warning displaying is performed at the stage of test operation, specifications of the air handling device 30 as a connection target of the outdoor device 10 may be changed, or the amount of refrigerant sealed in the refrigerant circuit G may be decreased. Accordingly, the air conditioning capacity can be reduced, and thereafter, proper air conditioning can be performed.

At the step S105, in a case where the air conditioning capacity is not extremely higher as compared to the air conditioning load (S105: No), the processing of the control device 60 proceeds to a step S109. That is, in a case where the air conditioning capacity of the air conditioning system 100 is extremely lower than the air conditioning load, the processing of the control device 60 proceeds to the step S109. For example, when a low-capacity heat exchanger 32 with a small heat transfer area and a low internal pipe volume is used and the air volume of the air supply fan 33 is relatively low, there is a probability that the air conditioning capacity is extremely low. When such a state is continued for a long period of time, a situation such as unavailability of cooling or heating of the air conditioning target space might occur.

At the step S109, the control device 60 determines whether or not the current rotation speed of the air supply fan 33 reaches a predetermined rotation speed upper limit. This rotation speed upper limit is the upper limit of the rotation speed of the air supply fan 33, and is set in advance.

At the step S109, in a case where the current rotation speed of the air supply fan 33 is lower than the rotation speed upper limit (S109: No), the control device 60 increases the rotation speed of the air supply fan 33. Accordingly, the air volume of the air supply fan 33 is increased, and the heat exchange performance of the air handling device 30 is increased. Thus, the air conditioning target space is properly air-conditioned.

On the other hand, at the step S109, in a case where the current rotation speed of the air supply fan 33 reaches the rotation speed upper limit (S109: Yes), the processing of the control device 60 proceeds to a step S111.

At the step S111, the control device 60 transmits the warning display signal to the remote controller 70. That is, even when the rotation speed of the air supply fan 33 is increased to the predetermined rotation speed upper limit (S109: Yes), if the air conditioning capacity is extremely low (S105: No), the control device 60 displays such a situation on the remote controller 70. In a case where such warning displaying is performed at the stage of test operation, the specifications of the air handling device 30 as the connection target of the outdoor device 10 may be changed, or additional refrigerant may be sealed in the refrigerant circuit G. Thus, the air conditioning capacity can be increased, and thereafter, proper air conditioning can be performed.

In a case where warning displaying of the step S111 is performed during the normal air conditioning operation, the indication of requiring, e.g., cleaning of the heat exchanger 32 may be displayed on the remote controller 70. This is because the heat exchange performance of the air handling device 30 can be often recovered by washing away dust and the like, adhering to the heat exchanger 32.

After the processing of the step S104 (Yes) and the processing of the step S107, S108, S110, or S111, the processing of the control device 60 returns to "START" ("RETURN"). As described above, the control device 60 repeats a series of processing illustrated in FIG. 2.

Advantageous Effects

According to the first embodiment, the rotation speed of the air supply fan 33 is adjusted (S107, S110 of FIG. 2), so that the air conditioning capacity of the air conditioning system 100 can be within a proper range. For example, in the case of using the high-capacity heat exchanger 32, the air supply fan 33 is driven at a relatively-low rotation speed, so that proper air conditioning can be performed. On the other hand, in the case of using the low-capacity heat exchanger 32, the air supply fan 33 is driven at a relatively-high rotation speed, so that proper air conditioning can be performed. Thus, the air handling device 30 with various specifications can be connected to the outdoor device 10. As described above, according to the first embodiment, the air conditioning system 100 exhibiting high reliability and having a high degree of freedom in selection of the air handling device 30 can be provided.

Moreover, multiple compressors are not necessarily provided as in JP-A-2016-109344 as a typical technology, and the processing of the control device 60 is relatively simple. Thus, the cost of the air conditioning system 100 can be reduced.

Further, even when the rotation speed of the air supply fan 33 is decreased to the rotation speed lower limit (S106 of FIG. 2: Yes), if the air conditioning capacity is extremely high (S105: Yes), such a situation is displayed on the remote controller 70 (S108). On the other hand, even when the rotation speed of the air supply fan 33 is increased to the rotation speed upper limit (S109: Yes), if the air conditioning capacity is extremely low (S105: No), such a situation is displayed on the remote controller 70 (S111). Thus, the amount of refrigerant sealed in the refrigerant circuit G can be adjusted at the stage of test operation, and a user can be alerted about predetermined maintenance in subsequent air conditioning operation.

Second Embodiment

A second embodiment is different from the first embodiment in that an air conditioning capacity is increased/decreased by adjustment of the degree of opening of an expansion valve 41 (see FIG. 1), but is similar to the first embodiment on other points (e.g., a configuration of an air conditioning system 100: see FIG. 1). Thus, differences from the first embodiment will be described, and overlapping contents will not be described.

Figure 3:
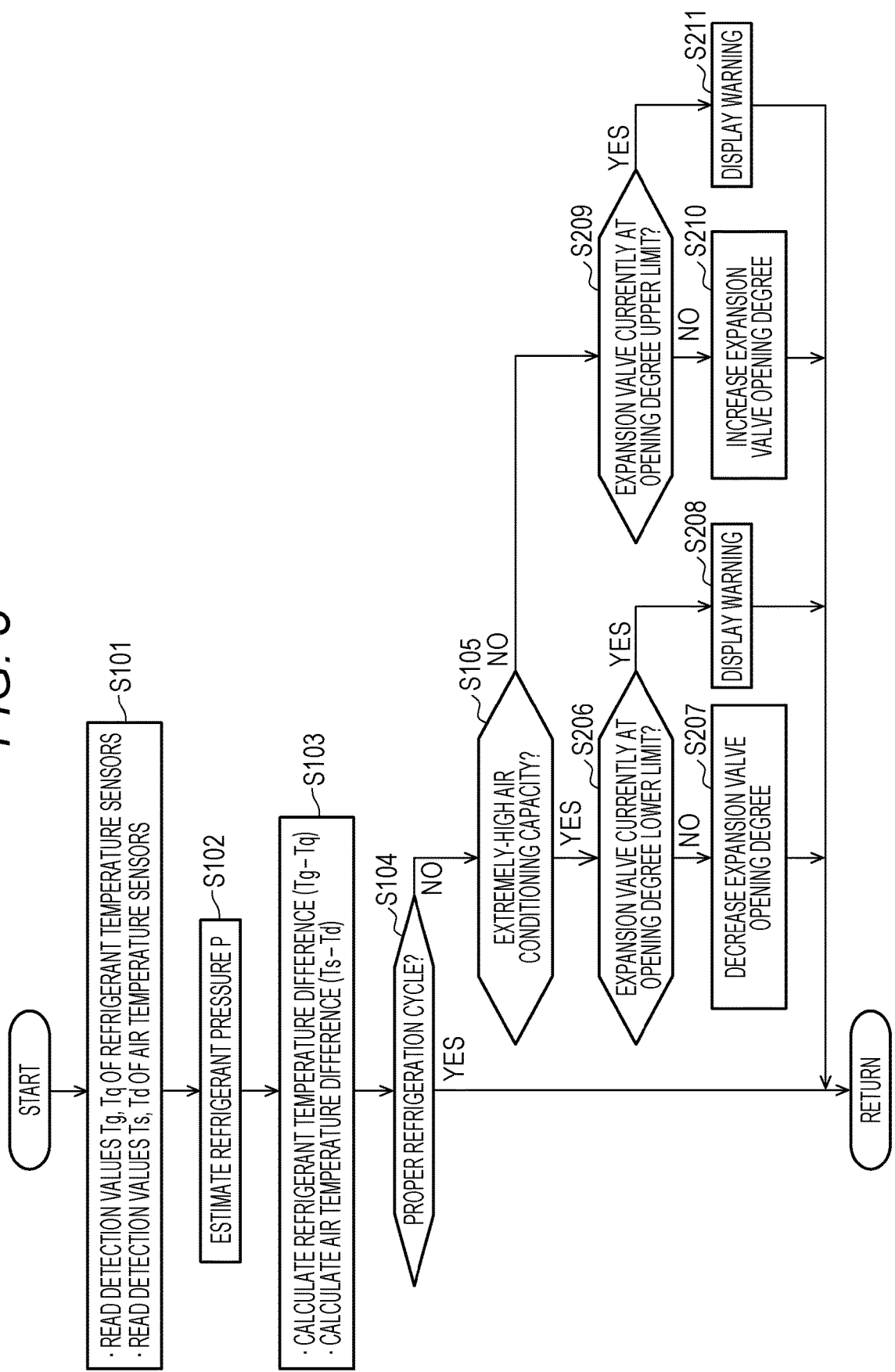
FIG. 3 is a flowchart of processing of a control device included in an air conditioning system according to a second embodiment of the present disclosure.

FIG. 3 is a flowchart of processing executed by a control device 60 (as necessary, see FIG. 1). Note that the same step number is used to represent processing similar to that of the first embodiment (see FIG. 2).

At a step S104, the control device 60 determines whether or not a refrigeration cycle in a refrigerant circuit G is in a proper state. In a case where the refrigeration cycle is not in the proper state (S104: No), the processing of the control device 60 proceeds to a step S105.

At the step S105, the control device 60 determines whether or not the air conditioning capacity is extremely higher as compared to an air conditioning load. Note that the method for determining whether or not the air conditioning capacity is extremely high (or extremely low) is as described in the first embodiment. At the step S105, in a case where the air conditioning capacity is extremely higher as compared to the air conditioning load (S105: Yes), the processing of the control device 60 proceeds to a step S206. For example, when a high-capacity heat exchanger 32 is used, the flow rate of refrigerant circulating in the refrigerant circuit G tends to be extremely high, and as a result, the air conditioning capacity tends to be extremely high.

At the step S206, the control device 60 determines whether or not a current degree of opening of the expansion valve 41 is decreased to a predetermined opening degree lower limit. This opening degree lower limit is the lower limit of the degree of opening of the expansion valve 41, and is set in advance.

At the step S206, in a case where the current degree of opening of the expansion valve 41 is higher than the opening degree lower limit (S206: No), the processing of the control device 60 proceeds to a step S207.

At the step S207, the control device 60 decreases the degree of opening of the expansion valve 41. Thus, the flow rate of refrigerant circulating in the refrigerant circuit G is decreased. Consequently, the air conditioning capacity is reduced, and an air conditioning target space is properly air-conditioned.

On the other hand, at the step S206, in a case where the current degree of opening of the expansion valve 41 is decreased to the opening degree lower limit (S206: Yes), the processing of the control device 60 proceeds to a step S208.

At the step S208, the control device 60 transmits a warning display signal to a remote controller 70. That is, even when the degree of opening of the expansion valve 41 is decreased to the predetermined opening degree lower limit (S206: Yes), if the air conditioning capacity is extremely high (S105: Yes), the control device 60 displays such a situation on the remote controller 70 (S208). In a case where such warning displaying is performed at the stage of test operation, specifications of an air handling device 30 as a connection target of an outdoor device 10 may be changed, or the amount of refrigerant sealed in the refrigerant circuit G may be decreased. Accordingly, the air conditioning capacity can be reduced, and thereafter, proper air conditioning can be performed.

At the step S105, in a case where the air conditioning capacity is not extremely higher but extremely lower as compared to the air conditioning load (S105: No), the processing of the control device 60 proceeds to a step S209. For example, when a low-capacity heat exchanger 32 is used, the flow rate of refrigerant circulating in the refrigerant circuit G tends to be extremely low, and as a result, the air conditioning capacity tends to be extremely low.

At the step S209, the control device 60 determines whether or not the current degree of opening of the expansion valve 41 reaches a predetermined opening degree upper limit. This opening degree upper limit is the upper limit of the degree of opening of the expansion valve 41, and is set in advance.

At the step S209, in a case where the degree of opening of the expansion valve 41 is lower than the opening degree upper limit (S209: No), the processing of the control device 60 proceeds to a step S210.

At the step S210, the control device 60 increases the degree of opening of the expansion valve 41. Thus, the flow rate of refrigerant circulating in the refrigerant circuit G is increased. Consequently, the air conditioning capacity is increased, and the air conditioning target space is properly air-conditioned.

On the other hand, at the step S209, in a case where the degree of opening of the expansion valve 41 reaches the opening degree upper limit (S209: Yes), the processing of the control device 60 proceeds to a step S211.

At the step S211, the control device 60 transmits the warning display signal to the remote controller 70. That is, even when the degree of opening of the expansion valve 41 is increased to the predetermined opening degree upper limit (S209: Yes), if the air conditioning capacity is extremely low (S105: No), the control device 60 displays such a situation on the remote controller 70 (S211). Thus, a user can be alerted about addition of refrigerant at the stage of test operation and maintenance in subsequent air conditioning operation.

After the processing of the step S104 (Yes) and the processing of the step S207, S208, S210, or S211, the processing of the control device 60 returns to "START" ("RETURN"). As described above, the control device 60 repeats a series of processing illustrated in FIG. 3.

Advantageous Effects

According to the second embodiment, the degree of opening of the expansion valve 41 is adjusted (S207, S210 of FIG. 3), so that the air conditioning capacity of the air conditioning system 100 can be within a proper range. Thus, the air handling device 30 with various specifications can be connected to the outdoor device 10, and therefore, the degree of freedom in selection of the air handling device 30 can be increased as compared to that in a typical case.

Moreover, even when the degree of opening of the expansion valve 41 is decreased to the opening degree lower limit (S206: Yes), if the air conditioning capacity is extremely high (S105: Yes), such a situation is displayed on the remote controller 70 (S208). On the other hand, even when the degree of opening of the expansion valve 41 is increased to the opening degree upper limit (S209: Yes), if the air conditioning capacity is extremely low (S105: No), such a situation is displayed on the remote controller 70 (S211). Thus, the amount of refrigerant sealed in the refrigerant circuit G can be adjusted at the stage of test operation, and the user can be alerted about predetermined maintenance in subsequent air conditioning operation.

Third Embodiment

A third embodiment is different from the first embodiment in that a refrigerant leakage is sensed based on a refrigerant temperature detection value, but is similar to the first embodiment on other points (e.g., a configuration of an air conditioning system 100: see FIG. 1). Thus, differences from the first embodiment will be described, and overlapping contents will not be described.

Figure 4:
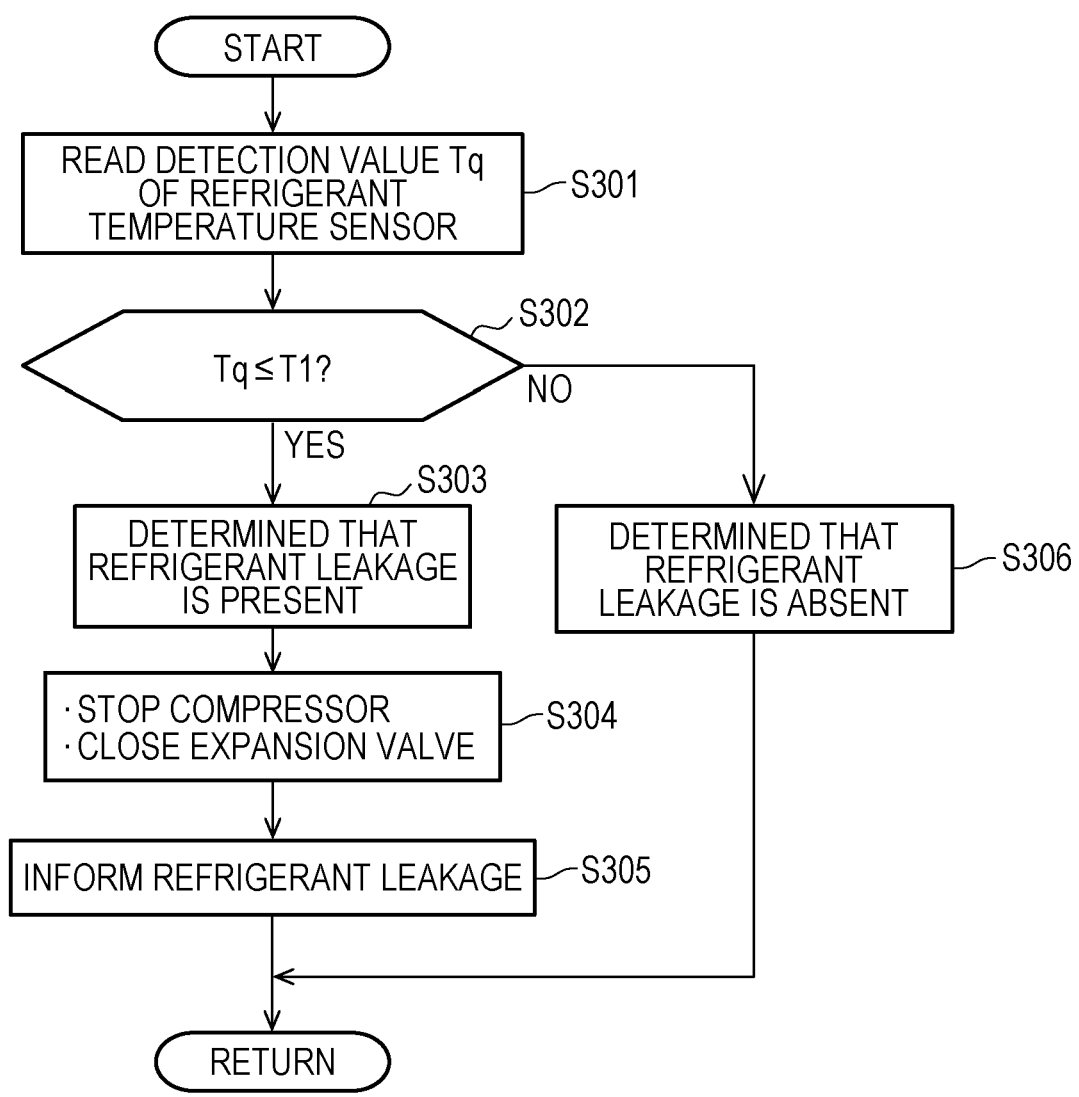
FIG. 4 is a flowchart of processing of a control device included in an air conditioning system according to a third embodiment of the present disclosure.

FIG. 4 is a flowchart of processing executed by a control device 60 (as necessary, see FIG. 1). Note that it is assumed that air heating operation is performed (i.e., a heat exchanger 32 functions as a condenser) during a series of processing illustrated in FIG. 4.

Moreover, a series of processing illustrated in FIG. 4 is performed in parallel with the processing (see FIG. 2) of the control device 60 described in the first embodiment.

At a step S301, the control device 60 reads a detection value Tq of a refrigerant temperature sensor 52. That is, the control device 60 reads the temperature (the detection value Tq) of refrigerant heat-exchanged by the heat exchanger 32 as the condenser.

At a step S302, the control device 60 determines whether or not the detection value Tq read at the step S301 is equal to or less than a predetermined threshold T1. The predetermined threshold T1 is a threshold as a reference for determination on whether or not the refrigerant leakage occurs in a refrigerant circuit G, and is set in advance.

At the step S302, in a case where the detection value Tq is equal to or less than the predetermined threshold T1 (S302: Yes), the processing of the control device 60 proceeds to a step S303. If the refrigerant leakage occurs, the amount of refrigerant sealed in the refrigerant circuit G reaches less than that in a normal state. As a result, in many cases, upon condensation in the heat exchanger 32, refrigerant is extremely cooled, and therefore, the refrigerant temperature reaches lower than that in the normal state.

At the step S303, the control device 60 determines that the "refrigerant leakage is present" in the refrigerant circuit G. Note that in addition to the detection value Tq of the refrigerant temperature sensor 52, the control device 60 may determine the presence or absence of the refrigerant leakage based on the rotation speed of a motor (not shown) of a compressor 11, the degrees of opening of an outdoor expansion valve 16 and an expansion valve 41, and detection values of other sensors, for example.

At a step S304, the control device 60 stops the compressor 11, and closes the expansion valve 41. Thus, a refrigerant flow in the refrigerant circuit G can be stopped (i.e., air conditioning operation can be forcibly stopped).

At a step S305, the control device 60 transmits a signal for informing the refrigerant leakage to a remote controller 70. Thus, the indication of occurrence of the refrigerant leakage in the refrigerant circuit G is displayed on the remote controller 70. Consequently, the necessity for maintenance such as replacement of a pipe can be informed to a user.

At the step S302, in a case where the detection value Tq is greater than the predetermined threshold T1 (S302: No), the processing of the control device 60 proceeds to a step S306.

At the step S306, the control device 60 determines that the "refrigerant leakage is absent" in the refrigerant circuit G, and continues the air conditioning operation.

After the processing of the step S305 or S306, the processing of the control device 60 returns to "START" ("RETURN"). As described above, the control device 60 repeats a series of processing illustrated in FIG. 4.

Advantageous Effects

According to the third embodiment, in a case where the refrigerant leakage is sensed (S302 of FIG. 4: Yes, S303), the compressor 11 is stopped, and the expansion valve 41 is closed (S304). This can prevent continuation of the air conditioning operation with the refrigerant leakage remaining to occur. In the case of sensing the refrigerant leakage, such a situation is informed to the user by the remote controller 70 (S304). Thus, according to the third embodiment, reliability of the air conditioning system 100 can be increased as compared to that of the first embodiment.

<<Variations>>

The air conditioning system 100 according to the present embodiment has been described above with reference to each embodiment, but the present embodiment is not limited to these contents. Various changes can be made.

For example, in each embodiment, the configuration in which the outdoor device 10 illustrated in FIG. 1 includes the supercooler 23, the supercooling expansion valve 24, and the pipes k7, k8 has been described, but these components may be omitted as necessary.

Moreover, in each embodiment, the configuration in which the outdoor device 10 includes the oil separator 17, the check valve 19, the capillary tubes 18, 22, the two-way valve 21, and the pipes k3, k5 has been described, but some or all of these components may be omitted as necessary.

Further, in each embodiment, the configuration in which the outdoor device 10 includes the four-way valve 15 has been described, but the present disclosure is not limited to such a configuration. That is, the four-way valve 15 may be omitted, and a configuration only for air cooling or air heating may be employed.

In addition, in each embodiment, the configuration in which the air conditioning system 100 includes the outdoor expansion valve 16 and the expansion valve 41 of the depressurization device 40 has been described, but one of these components may be omitted. That is, the outdoor device 10 may include at least the compressor 11 and the outdoor heat exchanger 13. That is, in a refrigerant circuit formed in such a manner that the compressor 11, the outdoor heat exchanger 13 (the first heat exchanger), the expansion valve 41, and the heat exchanger 32 (the second heat exchanger) are sequentially connected in an annular shape, refrigerant may circulate in the refrigeration cycle. Note that the above-described configuration includes the configuration of the refrigerant circuit G illustrated in FIG. 1.

Moreover, in each embodiment, the case where, e.g., the signal for warning displaying is transmitted from the control device 60 to the remote controller 70 has been described, but the present disclosure is not limited to such a case. That is, the control device 60 may transmit, e.g., the signal for warning displaying to the outdoor control circuit 25, and predetermined informing may be performed via, e.g., seven-segment displaying on an outdoor device 10 side.

Further, in each embodiment, the configuration in which the single outdoor device 10 and the single air handling device 30 are provided has been described, but the present disclosure is not limited to such a configuration. That is, multiple outdoor devices 10 may be connected in parallel, or multiple air handling devices 30 may be connected in parallel.

In addition, in the third embodiment, the processing (S303) of determining, by the control device 60, that the "refrigerant leakage is present" when the detection value Tq of the refrigerant temperature sensor 52 is equal to or less than the predetermined threshold T1 during the air heating operation (S302 of FIG. 4: Yes) has been described, but the present disclosure is not limited to such processing. For example, in a case where the detection value Tg of the refrigerant temperature sensor 51 is equal to or greater than a predetermined threshold during the air cooling operation, the control device 60 may determine that the "refrigerant leakage is present." In other words, in a case where the heat exchanger 32 functions as the evaporator, if the temperature detection value of refrigerant heat-exchanged by the heat exchanger 32 is equal to or greater than the predetermined threshold, the control device 60 may determine that the "refrigerant leakage is present." This is because when the refrigerant leakage occurs, the temperature of refrigerant in the heat exchanger 32 as the evaporator is often extremely increased. As described above, in a case where it is determined that the "refrigerant leakage is present," the control device 60 stops the compressor 11, and closes the expansion valve 41. Further, the control device 60 displays, on the remote controller 70, the indication of the refrigerant leakage present in the refrigerant circuit G.

Moreover, each embodiment may be combined as necessary.

For example, in a case where the first embodiment and the second embodiment are combined and the air conditioning capacity is extremely high, the control device 60 may decrease the rotation speed of the air supply fan 33, and may decrease the degree of opening of the expansion valve 41. Thus, the air conditioning capacity can be reduced, and the air conditioning target space can be properly air-conditioned.

On the other hand, in the case of an extremely-low air conditioning capacity, the control device 60 may increase the rotation speed of the air supply fan 33, and may increase the degree of opening of the expansion valve 41. Thus, the air conditioning capacity can be increased, and the air conditioning target space can be properly air-conditioned. As described above, the control device 60 may adjust the rotation speed of the air supply fan 33 and/or the degree of opening of the expansion valve 41 based on information including the detection values of the refrigerant temperature sensors 51, 52 and the air temperature sensors 53, 54.

Moreover, the second embodiment and the third embodiment may be combined such that the degree of opening of the expansion valve 41 is adjusted based on the air conditioning capacity (the second embodiment) and the refrigerant leakage is sensed (the third embodiment).

Each embodiment is detailed description for clearly describing the present embodiment, and is not limited to those including all configurations described above. Moreover, for some of the configurations of each embodiment, additions/deletions/replacements of other configurations may be made.

Further, the above-described mechanisms or configurations have been described as those assumed necessary for description, and all mechanisms or configurations for a product have not been necessarily described.

What is claimed is:
1. An air conditioning system comprising:
an outdoor device including at least a compressor and a first heat exchanger;
an air handling device including an air supply fan and a second heat exchanger;
an expansion valve;
a display; and
a controller,
wherein the compressor, the first heat exchanger, the expansion valve, and the second heat exchanger are sequentially connected in an annular shape to form a refrigerant circuit in which refrigerant circulates, and
wherein the controller is programmed to:
adjust a rotation speed of the air supply fan and a degree of opening of the expansion valve based on information including a temperature detection value of refrigerant on each of one end side and other end side of the second heat exchanger, a temperature detection value of air toward the second heat exchanger, and a temperature detection value of air heat-exchanged by the second heat exchanger,
upon determining the rotation speed of the air supply fan is decreased to a predetermined rotation speed lower limit, and a value obtained by subtracting the temperature detection value of air heat-exchanged by the second heat exchanger from a predetermined temperature is greater than a predetermined threshold, display a first warning on the display, and
upon determining the rotation speed of the air supply fan is increased to a predetermined rotation speed upper limit, and the value obtained by subtracting the temperature detection value of air heat-exchanged by the second heat exchanger from the predetermined temperature is not greater than the predetermined threshold, display a second warning on the display.

2. The air conditioning system according to claim 1, wherein the controller is programmed to:
decrease the rotation speed of the air supply fan upon determining the value obtained by subtracting the temperature detection value of air heat-exchanged by the second heat exchanger from the predetermined temperature is greater than the predetermined threshold, and
increase the rotation speed of the air supply fan upon determining the value obtained by subtracting the temperature detection value of air heat-exchanged by the second heat exchanger from the predetermined temperature is not greater than the predetermined threshold.

3. The air conditioning system according to claim 1, wherein the controller is programmed to:
decrease the degree of opening of the expansion valve upon determining a value obtained by subtracting the temperature detection value of air heat-exchanged by the second heat exchanger from a predetermined temperature is greater than a predetermined threshold, and
increase the degree of opening of the expansion valve upon determining the value obtained by subtracting the temperature detection value of air heat-exchanged by the second heat exchanger from the predetermined temperature is not greater than the predetermined threshold.

4. The air conditioning system according to claim 3, further comprising:
a display configured to perform predetermined displaying regarding air conditioning,
wherein the controller is programmed to:
even when the degree of opening of the expansion valve is decreased to a predetermined opening degree lower limit, and the value obtained by subtracting the temperature detection value of air heat-exchanged by the second heat exchanger from a predetermined temperature is greater than the predetermined threshold, display a first warning on the display, and
even when the degree of opening of the expansion valve is increased to a predetermined opening degree upper limit, and the value obtained by subtracting the temperature detection value of air heat-exchanged by the second heat exchanger from the predetermined temperature is not greater than the predetermined threshold, display a second warning the display.

5. The air conditioning system according to claim 1, further comprising:
a display configured to perform predetermined displaying regarding air conditioning,
wherein the controller is programmed to:
in a case where the second heat exchanger functions as a condenser, when the temperature detection value of the refrigerant heat-exchanged by the second heat exchanger is equal to or less than a predetermined threshold, or
in a case where the second heat exchanger functions as an evaporator, when the temperature detection value of the refrigerant heat-exchanged by the second heat exchanger is equal to or greater than a predetermined threshold,
stop the compressor, closes the expansion valve, and display, on the display, an indication of occurrence of a refrigerant leakage in the refrigerant circuit.

6. An air conditioning method executed by a control section of an air conditioning system including an outdoor device having at least a compressor and a first heat exchanger, an air handling device having an air supply fan and a second heat exchanger, an expansion valve, a display and a controller, the compressor, the first heat exchanger, the expansion valve, and the second heat exchanger being sequentially connected in an annular shape to form a refrigerant circuit in which refrigerant circulates, the method comprising:
adjusting, by the controller, a rotation speed of the air supply fan and a degree of opening of the expansion valve based on information including a temperature detection value of refrigerant on each of one end side and other end side of the second heat exchanger, a temperature detection value of air toward the second heat exchanger, and a temperature detection value of air heat-exchanged by the second heat exchanger;
upon determining the rotation speed of the air supply fan is decreased to a predetermined rotation speed lower limit, and a value obtained by subtracting the temperature detection value of air heat-exchanged by the second heat exchanger from a predetermined temperature is greater than a predetermined threshold, displaying a first warning on the display; and
upon determining the rotation speed of the air supply fan is increased to a predetermined rotation speed upper limit, and the value obtained by subtracting the temperature detection value of air heat-exchanged by the second heat exchanger from the predetermined temperature is not greater than the predetermined threshold, displaying a second warning on the display.

7. A controller for outputting a control signal to an air conditioning device including an outdoor device having at least a compressor and a first heat exchanger, an air handling device having an air supply fan and a second heat exchanger, and an expansion valve, the compressor, the first heat exchanger, the expansion valve, and the second heat exchanger being sequentially connected in an annular shape to form a refrigerant circuit in which refrigerant circulates, wherein the controller is programmed to:
adjust a rotation speed of the air supply fan and a degree of opening of the expansion valve based on information including a temperature detection value of refrigerant on each of one end side and other end side of the second heat exchanger, a temperature detection value of air toward the second heat exchanger, and a temperature detection value of air heat-exchanged by the second heat exchanger,
upon determining the rotation speed of the air supply fan is decreased to a predetermined rotation speed lower limit, and a value obtained by subtracting the temperature detection value of air heat-exchanged by the second heat exchanger from a predetermined temperature is greater than a predetermined threshold, display a first warning on a display, and
upon determining the rotation speed of the air supply fan is increased to a predetermined rotation speed upper limit, and the value obtained by subtracting the temperature detection value of air heat-exchanged by the second heat exchanger from the predetermined temperature is not greater than the predetermined threshold, display a second warning on the display.

* * * * *